US009059505B1

(12) United States Patent
Asrani et al.

(10) Patent No.: US 9,059,505 B1
(45) Date of Patent: Jun. 16, 2015

(54) SYSTEMS AND METHODS FOR A RECONFIGURABLE ANTENNA USING DESIGN ELEMENTS ON AN ELECTRONIC DEVICE HOUSING

(71) Applicant: Motorola Mobility LLC, Libertyville, IL (US)

(72) Inventors: Vijay L Asrani, Round Lake, IL (US); Timothy J Sutherland, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/144,547

(22) Filed: Dec. 31, 2013

(51) Int. Cl.
*H04M 1/00* (2006.01)
*H01Q 1/24* (2006.01)
*H01Q 21/30* (2006.01)

(52) U.S. Cl.
CPC ............ *H01Q 1/243* (2013.01); *H01Q 21/30* (2013.01); *H04B 1/3888* (2013.01)

(58) Field of Classification Search
CPC ........... H01Q 1/243; H01Q 9/42; H01Q 1/38; H01Q 19/005; H01Q 1/244; H01Q 1/36; H01Q 5/001; H01Q 5/0034; H01Q 1/273; H01Q 1/40; H04W 88/02; H04W 4/02; H04B 1/3833; H04B 1/3877; H04B 1/3888
USPC ....................................................... 455/575.7
See application file for complete search history.

(56) References Cited

U.S. PATENT DOCUMENTS

| 6,501,427 B1 | 12/2002 | Lilly et al. |
| 7,456,793 B2 | 11/2008 | Napoles et al. |
| 7,469,152 B2 | 12/2008 | Cetiner et al. |
| 8,442,467 B1 | 5/2013 | Rausch et al. |
| 2005/0200529 A1* | 9/2005 | Watanabe .............. 343/700 MS |
| 2005/0245204 A1 | 11/2005 | Vance |

(Continued)

FOREIGN PATENT DOCUMENTS

WO 2005/074070 A1 8/2005

OTHER PUBLICATIONS

Nathan P. Cummings, "Active Antenna Bandwidth Control Using Reconfigurable Antenna Elements", http://scholar.lib.vt.edu/theses/available/etd-12082003-110802/unrestricted/etd-121203.pdf, Dissertation submitted to the Faculty of the Virginia Polytechnic Institute & State University, Dec. 8, 2003, 200 pages.

(Continued)

*Primary Examiner* — Kwasi Karikari
(74) *Attorney, Agent, or Firm* — Leydig, Voit & Mayer, Ltd.

(57) ABSTRACT

Systems and methods are disclosed for providing an electronic device (700) that includes a back housing (702) at least partially formed from a plurality of discrete antenna elements (706) and an antenna switching module (701) for selectively coupling two or more of the antenna elements to an antenna feed (723). The coupled antenna elements form an antenna for transmitting and/or receiving wireless communication signals. The antenna switching module includes a plurality of switches (716) configured to selectively couple together two or more of the antenna elements; a plurality of electrical posts (729) coupled to the switches; a plurality of radio frequency chokes (735) respectively coupled to the electrical posts; and a biasing module (725) coupled to the radio frequency chokes for selectively applying a bias voltage to the switches.

29 Claims, 10 Drawing Sheets

(56) References Cited

U.S. PATENT DOCUMENTS

| | | | |
|---|---|---|---|
| 2007/0285318 A1* | 12/2007 | Sotoudeh et al. | 343/702 |
| 2009/0128428 A1 | 5/2009 | Ishizuka et al. | |
| 2010/0149069 A1* | 6/2010 | Kim | 343/904 |
| 2010/0245195 A1 | 9/2010 | Wilson | |
| 2010/0255892 A1* | 10/2010 | Harada | 455/575.1 |
| 2011/0037676 A1* | 2/2011 | Kobayashi et al. | 343/853 |
| 2013/0099996 A1 | 4/2013 | Tseng et al. | |
| 2013/0234910 A1 | 9/2013 | Oh et al. | |

OTHER PUBLICATIONS

European Patent Office, International Search Report and the Written Opinion in International Patent Application PCT/US2014/072741 (Mar. 17,2015).

* cited by examiner

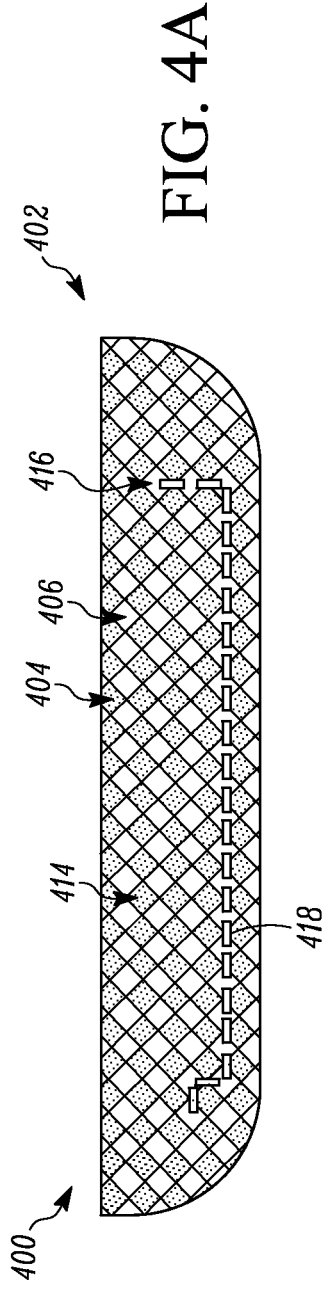
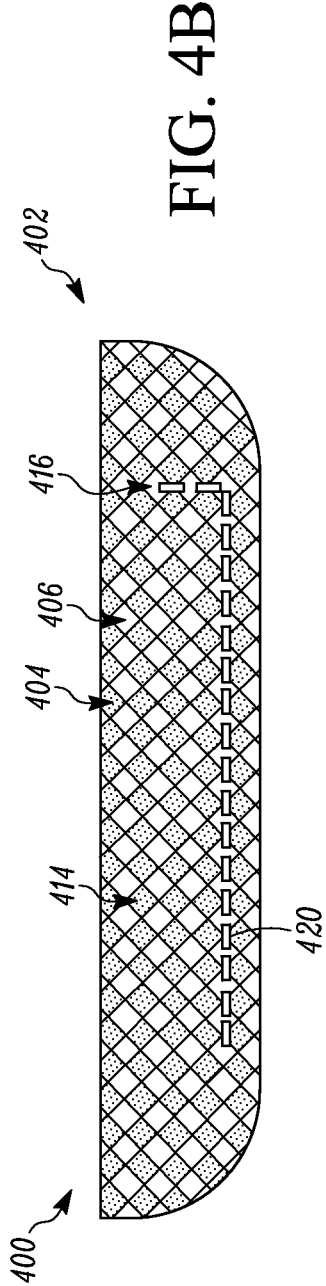
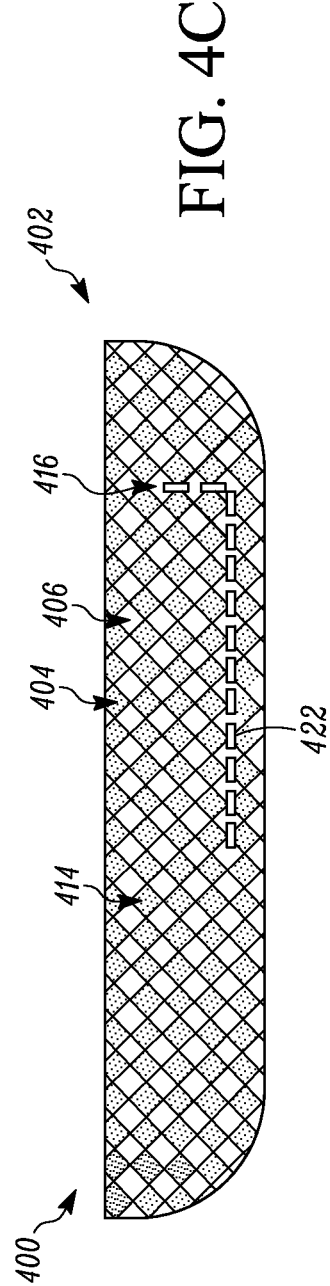

SYSTEMS AND METHODS FOR A RECONFIGURABLE ANTENNA USING DESIGN ELEMENTS ON AN ELECTRONIC DEVICE HOUSING

FIELD

This application generally relates to wireless communication devices. In particular, the application relates to platforms and techniques for providing a reconfigurable antenna in wireless communications devices.

BACKGROUND

Modern wireless communication devices, including mobile telephones and other portable radio communication devices, offer an expanded set of features that are increasingly dependent on bandwidth and require complex circuitry for performing the multitude of functions that enable those features. One such feature is the flexibility to operate under multiple communications standards and/or across multiple bands of operation to enable interoperability between existing and emerging radio access technologies (RATs) and/or to accommodate international business and recreational travelers. Another feature is the ability to provide high speed, high data rate wireless communications in order to satisfy the growing demand for connectivity in an increasingly mobile world.

To provide at least these features, mobile communications devices now have an increasing number of antennas, covering multiple frequency bands and both cellular RATs and non-cellular RATs. The cellular RATs may include, for example, GSM (Global System for Mobile Communications), EDGE (Enhanced Data Rates for GSM Evolution), UMTS (Universal Mobile Telecommunications System), and LTE (Long Term Evolution). Note that each of these RATs can be considered evolutions of the same platform and are colloquially referred to as 2G, 2.5G, 3G, and 4G technologies, respectively. CDMA (Code Division Multiple Access) is another cellular RAT and can be considered a competing 3G technology that blends into LTE's 4G technology. The non-cellular RATs may include, for example, Bluetooth®, Near Field Communication (NFC), Wireless Local Area Network (WLAN, a.k.a. WiFi), Wireless Metropolitan Area Networks (WMAN, a.k.a. WiMax), Radio Frequency Identification (RFID), Global Positioning System (GPS), etc. The increasing number of antennas has created an increasing number of antenna design challenges related to isolation, efficiency, bandwidth, impedance matching, insertion loss, and other related factors.

Further, since each RAT may support one or more frequency bands, and a particular frequency band may be assigned to a different RAT and/or a different wireless communication carrier in different regions of the world, global mobile device manufacturers often create multiple carrier, region, and/or RAT-specific versions or variants of their mobile devices in order to have a presence in various markets around the world. Each of these variants may include antennas and accompanying wireless communication circuitry (e.g., switches, power amplifiers, filters, duplexers, signal paths, transceivers, etc.) that are specifically tuned or optimized for the particular RAT(s) and/or frequency bands supported by the variant, thus increasing costs and manufacturing complexity. For example, some mobile device manufacturers may design a different antenna layout for each wireless communication carrier based on the specific RATs and/or frequency bands associated with the carrier.

Competing with the increasing demands on the radio portion of the mobile device is the constant push to minimize the size, weight, power consumption, and cost of mobile devices. Techniques for minimizing these characteristics include reducing the number of components and/or connections within the device and performing multiple functions using the same components. To that extent, some commercially-available mobile devices include one or more multi-band antennas that are capable of selectively operating in one of a plurality of frequency bands at a time. This arrangement reduces the total required antenna volume when compared against the alternative of a greater quantity of antennas, each having a fixed and narrower bandwidth.

However, multi-band antennas also add to the design complexity of the radio portion. For example, each multi-band antenna typically requires antenna matching circuitry, or an antenna switch module, as an interface between the antenna and the wireless communication circuitry in order to provide appropriate impedance matching over each frequency of operation. The more frequency bands covered by a mobile device, the more complicated the antenna matching circuitry. In view of these antenna design challenges, most commercially-available mobile devices include radio portions that can only operate in, and/or are specifically optimized for, a preset group of frequency bands.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIGS. 4A, 4B, and 4C illustrate example antenna configurations in a lower portion of an example back housing of an electronic device in accordance with some embodiments.

DETAILED DESCRIPTION

One proposed technique for providing a multi-band, multi-mode antenna is the reconfigurable antenna, which includes an array of antenna elements and switches for selectively coupling the antenna elements together to form an antenna. The antenna is "reconfigurable" in that the antenna pattern, antenna type, and/or the resonant frequency of the antenna can be adjusted by changing the number and placement of the antenna elements coupled together. However, existing implementations of this technique have been plagued by several factors, including antenna inefficiency, undesirable antenna coupling, and impedingly-high fabrication costs and complication levels (e.g., requiring monolithic integration).

Systems and methods disclosed herein provide a reconfigurable antenna formed by coupling discrete conductive elements aesthetically arranged on an exterior surface of an electronic device. In embodiments, the conductive elements can be small, three-dimensional islands arranged in a mosaic pattern on a back housing of the electronic device. The conductive elements may be selectively connected to, or disconnected from, neighboring conductive elements using a plurality of switches positioned within and/or adjacent to the back housing. In embodiments, certain combinations of the conductive elements are coupled to form the antenna depending on the desired frequency of operation and/or the desired antenna type. The systems and methods disclosed herein overcome the above antenna design constraints by providing techniques for activating the switches, including applying a bias voltage to the switch through an electrical post coupled between the back housing and a printed circuit board positioned within the electronic device. In embodiments, each electrical post is vertically aligned between the printed circuit board and the back housing, and a radio-frequency choke is coupled between each electrical post and switch, thereby reducing undesirable antenna coupling and improving antenna efficiency.

Figure 1B:
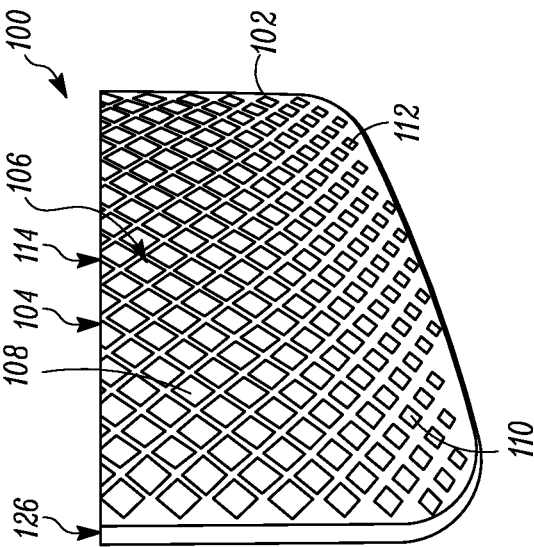
FIG. 1B illustrates a detailed view of a lower portion of the back housing shown in FIG. 1A.
Figure 1A:
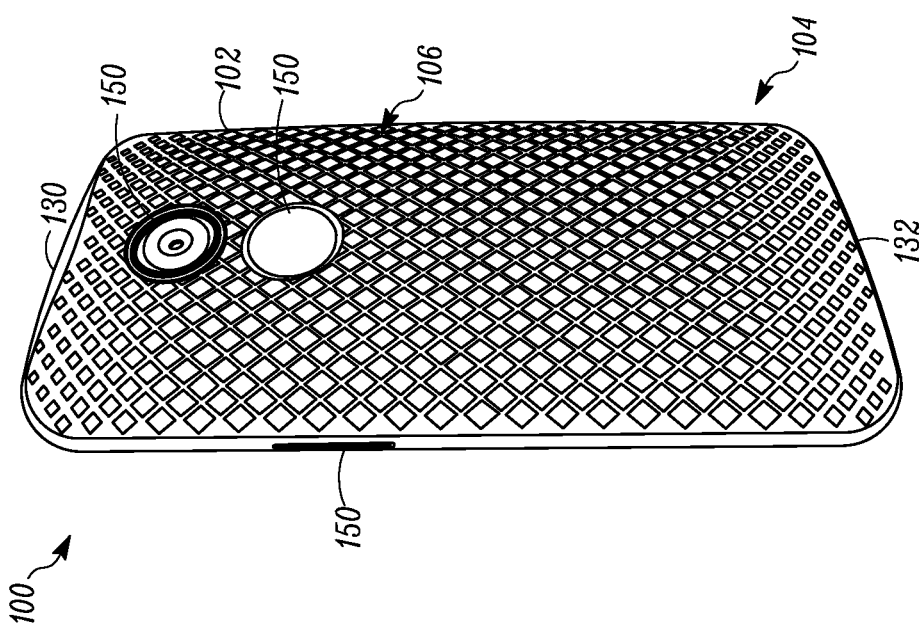
FIG. 1A illustrates a rear perspective view of an example electronic device including a back housing in accordance with some embodiments.

FIGS. 1A and 1B depict an example electronic device 100 consistent with some embodiments. It should be appreciated that the electronic device 100, as depicted, is merely an example and can include various combinations of hardware and/or software components. According to some embodiments, the electronic device 100 may be a mobile computing device, such as, for example, a smartphone or any other type of mobile communications device, a tablet, an e-reader, a portable gaming device, a portable media player, a personal digital assistant, a laptop computer, a desktop computer, or any other mobile or electronic device that includes one or more wireless communications devices. In FIGS. 1A and 1B, the electronic device 100 is depicted as a mobile device.

Specifically, FIG. 1A depicts a rear perspective view of the electronic device 100. As shown, the electronic device 100 includes a rear housing 102 (also referred to herein as a back housing 102). The rear housing 102 may be coupled to a back side of a main housing (not shown) of the electronic device 100. The main housing may house a majority of the electronic components included in the device 100. In some embodiments, the rear housing 102 may be detachably coupled to the main housing any of a number of known attachment mechanisms, including but not limited to, mechanical components (e.g., snap-on, screw-on), magnets, friction-based components (e.g., push-on), adhesive, etc.

As shown in FIG. 1A, and more clearly in the detailed view of FIG. 1B, the rear housing 102 includes a design component 104 with a plurality of aesthetic elements 106 arranged in a pattern. The aesthetic elements 106 can be arranged in any type of pattern and can vary in terms of physical characteristics (e.g., shape, design, color, size, dimension (e.g., two-dimensional or three-dimensional), etc.). The following paragraphs provide some examples of the variations contemplated herein, but in no way limit the disclosure to such examples.

In the illustrated embodiment, the aesthetic elements 106 are shaped as diamonds and arranged in a mosaic-type pattern that positions the elements 106 side-by-side. In this pattern, each element 106 has at least two sides in parallel with the sides of neighboring elements 106. Design components having other mosaic-type patterns, or non-mosaic patterns, are also contemplated by the techniques disclosed herein. For example, FIG. 4A depicts an example design component 404 with a plurality of diamond-shaped aesthetic elements 406 arranged in a mosaic-type pattern that positions the elements 406 corner-to-corner. In this pattern of FIG. 4A, each element 406 has no sides in parallel with neighboring elements 406.

Figure 2B:
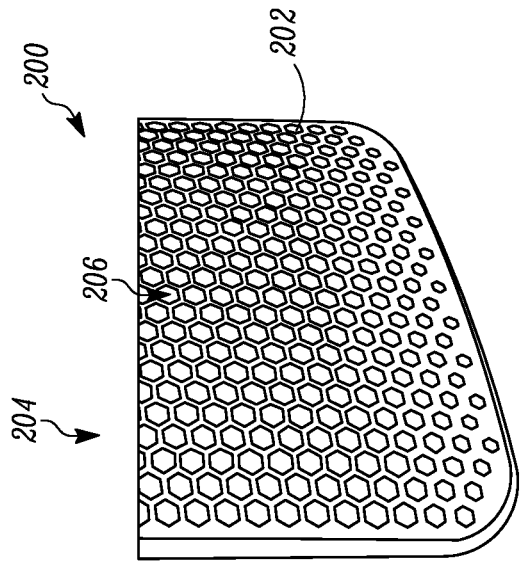
FIG. 2B illustrates a detailed view of a lower portion of the back housing shown in FIG. 2A.
Figure 2A:
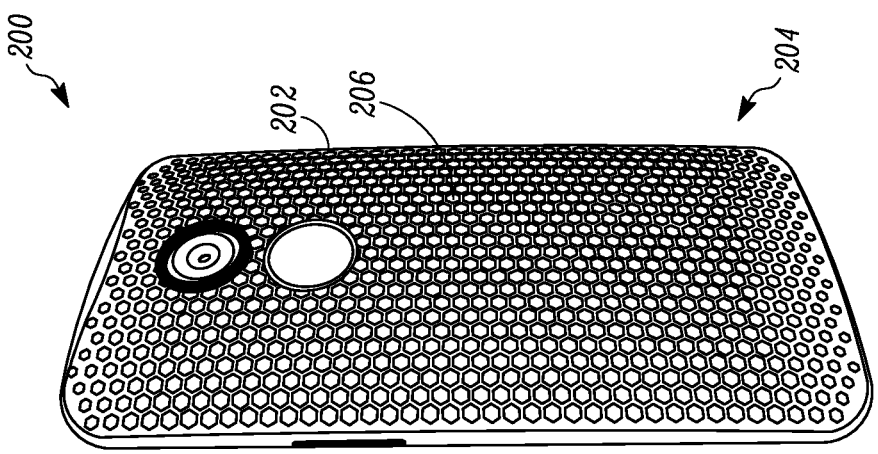
FIG. 2A illustrates a rear perspective view of an example electronic device including a back housing in accordance with some embodiments.
Figure 3B:
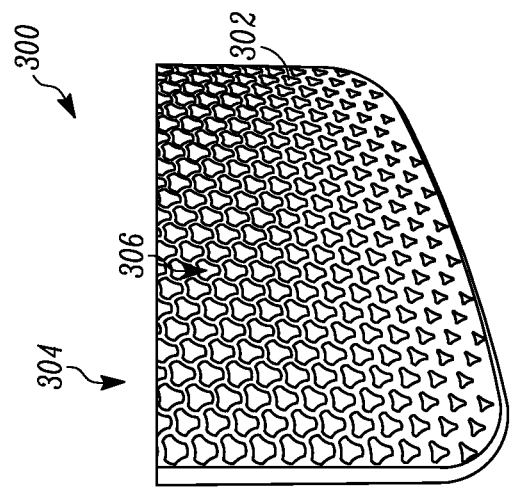
FIG. 3B illustrates a detailed view of a lower portion of the back housing shown in FIG. 3A.
Figure 3A:
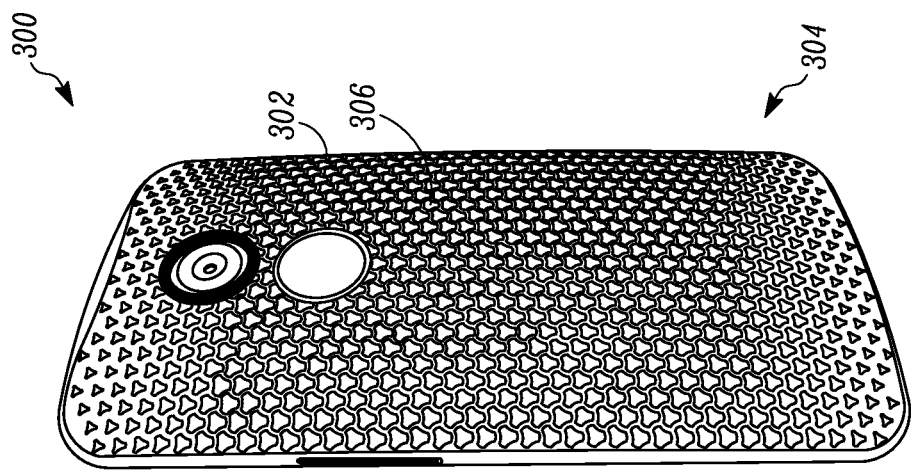
FIG. 3A illustrates a rear perspective view of an example electronic device including a back housing in accordance with some embodiments.
Figure 5:
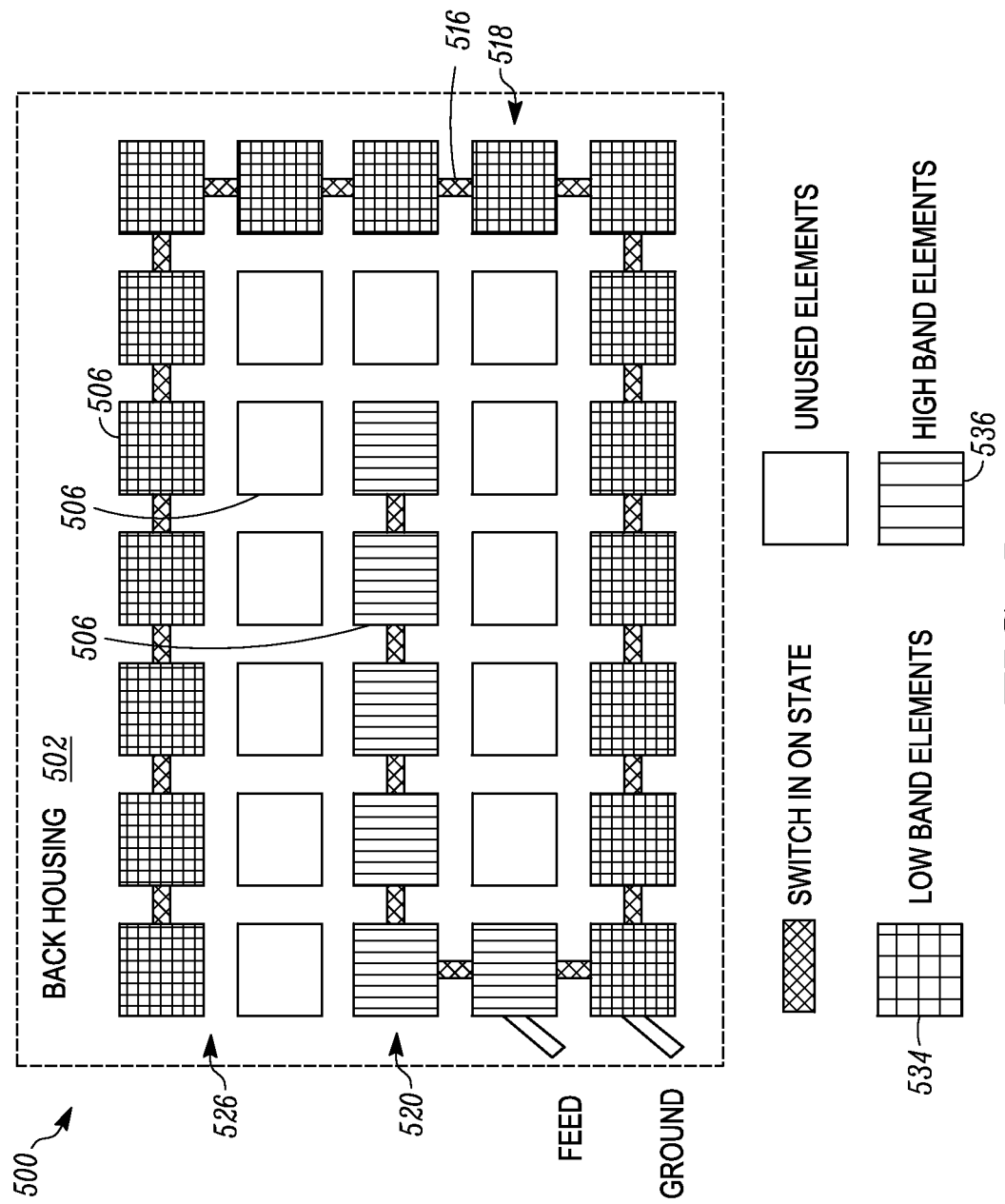
FIG. 5 illustrates a block diagram of an example back housing of an electronic device in accordance with some embodiments.

In some embodiments, instead of, or in addition to, the diamond-shaped aesthetic elements 106, the design component 104 may have elements 106 of other shapes or designs, including, for example, triangles, rectangles, circles, squares, hexagons, stars, hearts, horseshoes, etc. For example, FIGS. 2A and 2B depict an example design component 204 having hexagon-shaped aesthetic elements 206. As another example, FIGS. 3A and 3B depict an example design component 304 having polygonal-shaped aesthetic elements 306. As yet another example, FIG. 5 depicts an example back housing 502 having square-shaped aesthetic elements 506. In some embodiments, the design component 104 can include aesthetic elements 106 having more than one type of shape (e.g., stars and triangles, hexagons and pentagons).

In some embodiments, the aesthetic elements are substantially uniform in size and shape (e.g., as shown in FIGS. 4A and 5). In other embodiments, the aesthetic elements are substantially uniform in shape but non-uniform in size (e.g., as shown in FIGS. 1A, 2A, and 3A). In embodiments, a distance or spacing between adjoining elements within the design component can be determined by this uniformity, or lack thereof, in the shape and/or size of the aesthetic elements, as well as the type of pattern used to arrange the elements. Further, a size of the space between elements may vary depending on the shape of the elements and/or how the aesthetic elements 106 are arranged relative to each other. For example, in FIG. 4A because the aesthetic elements 406 are uniformly shaped and sized and arranged in a point-to-point mosaic pattern, the spacings 414 between the elements 406 are also uniform.

As another example, in FIG. 1A, the aesthetic elements 106 have substantially the same shape, but gradually change in size near a top edge 130 and a bottom edge 132 of the back housing 102. For example, in FIG. 1A, the aesthetic elements 106 are substantially the same size in a majority portion (e.g., a middle section) of the back housing 102. As the elements 106 approach either the top edge 130 or the bottom edge 132, they gradually decrease in size, for example, from a largest-sized element 108 (e.g., in the middle section) to a middle-sized element 110 (e.g., between the middle section and the edges), and finally, to a smallest-size element 112 (e.g., at the top edge 130 and/or the bottom edge 132). Although not shown in FIGS. 1A and 1B, the size changes may also occur in a transverse direction (i.e., side-to-side) in addition to the vertical changes shown. Of course, other overall patterns may be developed using the aesthetic elements 106 and variations on their sizes, spacing, and placement.

In FIG. 1A, because the aesthetic elements 106 are arranged in a side-by-side pattern, the spacings 114 between the elements 106 that have non-uniform sizing are also non-uniform. In embodiments, this gradual decrease in size correspondingly causes a gradual increase in spacing between adjoining, different-sized elements 106. As shown in FIG. 1B, for example, the spacing 114 between adjoining largest-sized elements 108 is smaller than the spacing 114 between adjoining middle-sized elements 110, which is smaller than the spacing 114 between adjoining smallest-sized elements 112. As will be appreciated, the larger spacings 114 between the smallest-sized elements 112 provide greater isolation between the elements 112 and therefore, may result in a better antenna performance than, for example, the largest-sized elements 108, which are less isolated. As an example, in one embodiment, the largest-sized elements 108 may have dimensions of approximately two millimeters wide by two millimeters tall, and the spacing 114 or gap between adjacent elements 108 may be approximately 0.5 millimeter. And the smallest-sized elements 112 may have dimensions of approximately one millimeter wide by one millimeter tall, and the spacing 114 between adjacent elements 112 may be approximately one millimeter.

According to embodiments, the design component 104 can be embedded or molded into, attached to, or otherwise included on an outer surface of the back housing 102 using any of a number of techniques. As an example, the aesthetic elements 106 of the design component 104 can be integrated or incorporated into the back housing 102, so that the design component 104 and the back housing 102 form one unit. In some embodiments, the back housing 102 includes a shell portion 126 that is over-molded to the design component 104. For example, the shell portion 126 may be made by pouring or injecting a material (e.g., plastic, silicone, rubber, etc.) into a mold containing the design component 104, so that the material fills the empty spaces of the design component 104, such as, e.g., the spacings 114 between the elements 106. As such, the spacings 114 may be considered part of the shell 126. The shell 126 may also include grooves and channels for attaching to the main housing of the electronic device 100 and openings 150 for receiving one or more buttons, switches, cameras, and/or flash devices of the electronic device 100.

In some embodiments, the back housing 102 may be manufactured so that at least a portion of the design component 104 remains raised above, or protrudes from, an outer surface of the shell 126. In such embodiments, the aesthetic elements 106 may be three-dimensional features of the back housing 102, while the shell 126, including the spacings 114, may be two-dimensional (e.g., planar or curve-planar) features of the same. As will be appreciated, any of a number of manufacturing techniques may be used to create the back housing 102 with the integrated design component 104, including, for example, imprinting, etching, engraving, moulding, and/or three-dimensional (3D) printing.

In embodiments, the components of the back housing 102 can be made of two different materials. Specifically, the shell 126 can be composed of a non-conductive material, such as, e.g., plastic, and the design component 104 can be composed of a conductive material, such as, e.g., metal. In such embodiments, the aesthetic elements 106 of the back housing 102 can be considered as "metal islands" because the elements 106 are isolated from each other by the non-conductive material of the shell 126. In embodiments, these metal islands (also referred to herein as conductive elements 106) can selectively operate as antenna elements, for example, after coupled together to form an antenna, as described below. As such, the conductive elements 106 can be configured to serve two different roles for the electronic device 100: (1) a cosmetic role, as aesthetic elements 106 of the back housing 102, and (2) a functional role, as antenna elements 106 coupleable together to form a reconfigurable antenna for the electronic device 100.

Figure 6:
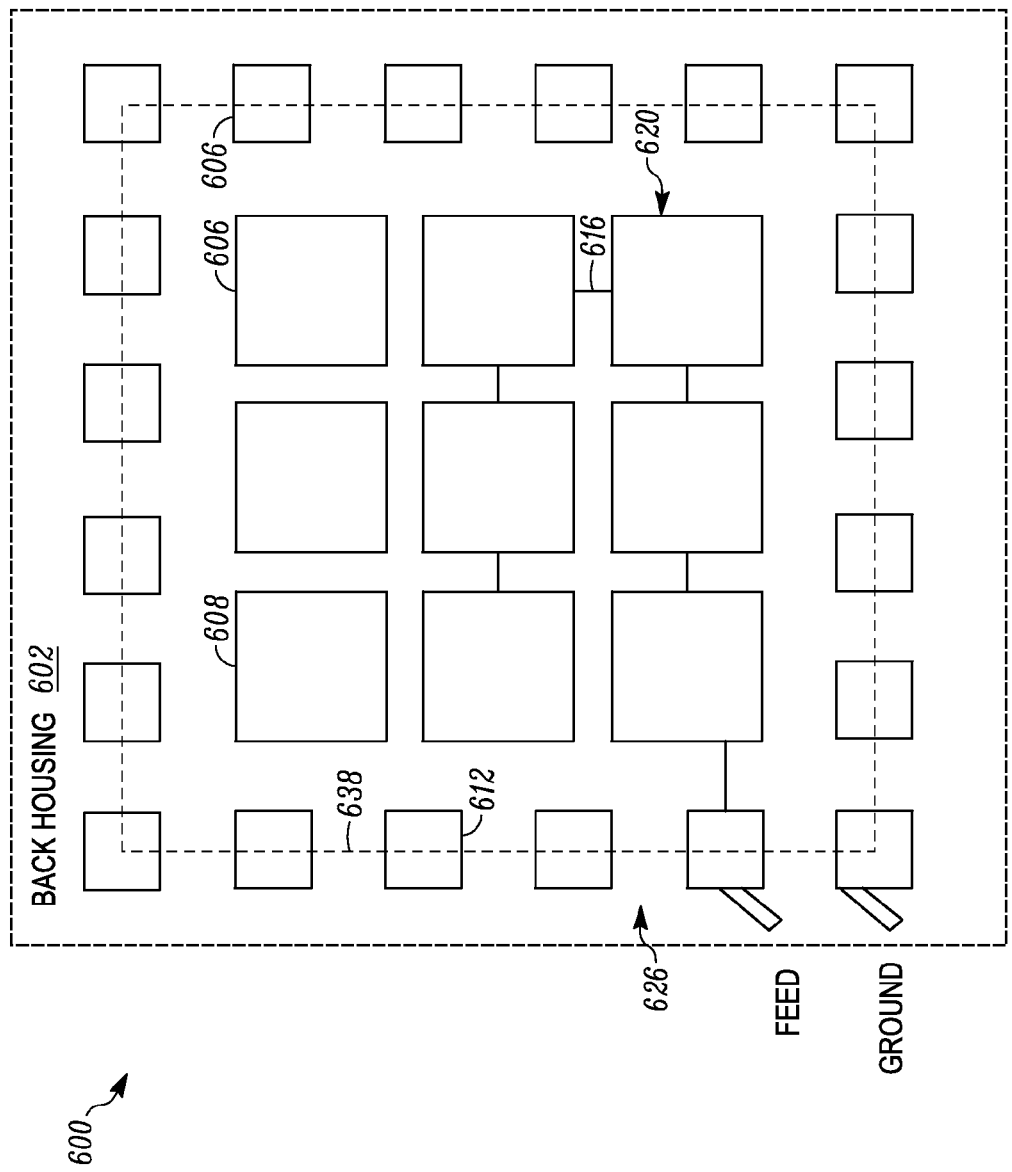
FIG. 6 illustrates a block diagram of an example back housing of an electronic device in accordance with some embodiments.

FIGS. 4A, 4B, and 4C each depict an example configuration of aesthetic elements 406 coupled together to form antennas 418, 420, 422, respectively, in accordance with the techniques disclosed herein. As discussed above, FIGS. 4A, 4B, and 4C show a bottom portion of the design component 404, which is included in a back housing 402 of an electronic device 400, and includes the conductive aesthetic elements 406 (also referred to herein as antenna elements 406) and the non-conductive spacings 414 positioned between the elements 406. Though FIGS. 4A, 4B, and 4C show only the bottom portion of the back housing 402, the antenna elements 406 may extend across the entire back housing 402, and may be connected to form antennas in other portions of the back housing 402, including, for example, at a top portion (not shown) of the back housing 402. Further, though FIGS. 4A, 4B, and 4C show three specific configurations, any number of antenna configurations may be formed by coupling together other and/or different combinations of the aesthetic elements 406 (e.g., as shown in FIGS. 5 and 6). The exact configuration of aesthetic elements 406 may depend on a number of factors, including, for example, the desired operating frequencies, the spectral availability, the region in which the device 400 is located, the wireless carrier associated with the device 400, the type of antenna structure to be formed, the number of antennas to be formed, and other considerations, as discussed in more detail below.

In each of FIGS. 4A, 4B, and 4C, a different number of adjacent antenna elements 406 are coupled together by a plurality of activated switches 416 to form the antennas 418, 420, 422. As illustrated, each switch 416 is selectively coupled to two adjacent antenna elements 406. The switches 416 can be activated in response to receiving a control signal from a control module (e.g., similar to control module 750, 850) of the electronic device 400. As discussed in more detail below, the control signal may indicate, and/or may be generated based on, information identifying, for example, which of the switches 416 to turn on or activate, which of the antenna elements 406 to link together, and/or a resonant frequency of the antenna to be formed. As such, the content of the control signal can determine which of the antennas 418, 420, 422 is formed and thereby, can facilitate active tuning of the reconfigurable antenna of the electronic device 400.

The antennas formed by the antenna elements 406, such as, e.g., the antennas 418, 420, 422, can support various types of wireless communications (or RATs), including non-cellular network communications (e.g., GPS, NFC, Bluetooth, WiFi, etc.) and voice and data cellular telephone communications (e.g., GSM, CDMA, UMTS, LTE, etc.). Moreover, the antennas formed by the antenna elements 406 can function in one or more frequency band(s) associated with the RATs supported by the electronic device 400. According to embodiments, the antenna elements 406 can be used to form antennas operable in any frequency band, including, for example, any of the Americas LTE bands. For example, the antenna 418 shown in FIG. 4A may be configured to operate at 700 MHz, the antenna 420 shown in FIG. 4B may be configured to operate at 850 MHz, and the antenna 422 shown in FIG. 4C may be configured to operate at 1900 MHz.

Further, the antennas 418, 420, 422 formed by the antenna elements 406 can serve as transmit (Tx) antennas that only send voice and/or data communications, receive (Rx) antennas that only receive voice and/or data communications, or transmit/receive (Tx/Rx) antennas that both send and receive voice and/or data communications. The specific function of any antenna formed by the antenna elements 406 may depend at least partially on the particular communication needs of the electronic device 400, such as, for example, the different RATs, frequency bands, regions, and/or wireless carriers supported by the device 400. The function of the antenna may further depend on the placement of the antenna elements 406 relative to the electronic components (not shown) within the electronic device 400 and/or the size, geometry, and/or layout of the antenna volume available within the electronic device 400. For example, Tx/Rx antennas generally require more antenna volume than, for example, Tx antennas or Rx antennas at least because Tx/Rx antennas need more bandwidth in order to cover both transmit and receive functions. As another example, Tx antennas generally require more antenna volume than, for example, Rx antennas at least because Tx antennas need higher antenna efficiency in order to satisfy performance requirements. Further, larger antenna volumes can allow for more flexibility in antenna banding (e.g., are able to be tuned to more frequencies). Accordingly, the main Tx/Rx antenna(s) of an electronic device may be formed within the largest, discrete antenna volume available. For example, in embodiments, each of the antennas 418, 420, 422 may function as Tx/Rx antennas, because the largest antenna volume of the electronic device 400 is placed near the bottom portion of the back housing 402 shown in FIGS. 4A, 4B, and 4C.

According to embodiments, the reconfigurable antenna formed by connecting together the antenna elements 406 can be actively tuned as the spectral needs of the electronic device 400 change by dynamically reconfiguring the connections between the antenna elements 406. For example, when the electronic device 400 moves from one network supporting a first operating frequency to another network supporting a second operating frequency, a different combination of switches 416 may be activated in order to form an antenna capable of supporting the spectral requirements of the new network. In some cases, a new antenna may be formed by activating one or more new switches 416, deactivating one or more of the currently active switches 416, and/or keeping active one or more of the currently active switches 416, depending on whether the new operating frequency is higher or lower than the current operating frequency. For example, upon determining that the spectral needs of the electronic device 400 have changed from 850 MHz to 1900 MHz, the control module may send a control signal to turn OFF or deactivate the six left-most switches 416 shown in FIG. 4B in order to shorten the antenna 420 and form the antenna 422 shown in FIG. 4C.

According to embodiments, there may be an inverse relationship between the resonant frequency of the antennas 418, 420, 422 and the length of the antenna, or in this case, the respective number of antenna elements 406 coupled together to form the antennas. For example, in FIG. 4A, the antenna 418, which provides low-band coverage, is formed by connecting or linking together a relatively large number of antenna elements 406 (e.g., twenty-three), while the antenna 422, which provides high-band coverage, is formed by linking together a relatively small number of antenna elements 406 (e.g., fourteen). Moreover, the antennas 418, 420, 422 can be tuned to a higher resonant frequency by shortening the antenna length, for example, by disconnecting one or more antenna elements 406 through deactivation of the switch(es) 416 coupled to those elements 406. Likewise, the antennas 418, 420, 422 can be tuned to a lower resonant frequency by lengthening the antenna, for example, by connecting additional antenna element(s) 406 through activation of additional switch(es) 416 coupled to the additional element(s) 406. More discussion on the bandwidth associated with each antenna element appears below with respect to FIG. 6.

Turning now to FIG. 5, shown is a portion of an electronic device 500 with an example back housing 502 including a plurality of conductive, aesthetic elements 506 (also referred to herein as antenna elements 506) and a non-conductive shell 526 that isolates the antenna elements 506 from neighboring elements 506. As also shown in FIG. 5, a first group 534 of elements 506 (e.g., as indicated by the hatched filling) are coupled or linked together by a first set of activated switches 516 to form an exemplary low band antenna 518 and a second group 536 of elements 506 (e.g., as indicated by the lined filling) are coupled together by a second set of activated switches 516 to form an exemplary high band antenna 520. The remaining antenna elements 506 are not being used to form an antenna in the current example, but could be added to either of the antennas 518, 520 by activating one or more of the switches 516 (not shown) coupled to the unused elements 506. The separation of low and high frequency band antennas shown in FIG. 5 may allow for more efficient use of the antenna volume at the bottom of the electronic device 500, especially because antennas tuned to lower frequency bands require more antenna volume (for example, as can be appreciated from the larger number of elements 506 in the group 534 than the group 536).

According to embodiments, any suitable type of antenna structure can be formed when connecting the antenna elements 506 to form an antenna, including, e.g., monopole, dipole, dual-arm, an inverted L-antenna, dual inverted L-antenna, inverted-F antenna, or hybrids of these antenna structures. For example, in FIG. 5, the antenna elements 506 in the first group 534 have an overall shape or layout that corresponds to a planar inverted-F antenna. As another example, in FIG. 4B, the antenna elements 406 have an overall layout that corresponds to an inverted L antenna. According to certain aspects, after the connections between the antenna elements 506 are reconfigured to form a new antenna, the type of antenna structure can also change. In some embodiments, a control signal may indicate the type of antenna structure to be formed, in addition to, or instead of, identifying which antenna elements 506 to connect, which switches 516 to activate, and/or the resonant frequency of the antenna to be formed.

FIG. 6 depicts an electronic device 600 with an example back housing 602 including a plurality of conductive, aesthetic elements 606 (also referred to herein as antenna elements 606). The plurality of antenna elements 606 includes a plurality of large antenna elements 608 and a plurality of small antenna elements 612. As also shown in FIG. 6, select antenna elements 606 have been coupled or linked together by a plurality of activated switches 616 to form an exemplary antenna 620. Specifically, the antenna elements 606 that form the antenna 620 include one of the small antenna elements 612 and six of the large antenna elements 614. The back housing 602 further includes a non-conductive shell 626 that isolates the antenna elements 606 from neighboring elements 606.

According to embodiments, during operation the antenna 620 can be actively tuned by connecting or disconnecting certain antenna elements 606 as needed to achieve a specific resonant frequency. For example, each antenna element 606 included in the antenna 620 can be associated with a specific bandwidth that affects the resonant frequency of the antenna 620. The exact bandwidth represented by each antenna element 606 may vary depending on a variety of factors, including, for example, the shape and/or size of the antenna element 606. According to some embodiments, the larger-sized antenna element 608 can correspond to a larger frequency shift effect, and the smaller-sized antenna element 612 can correspond to a smaller frequency shift effect. As an example, adding each large antenna element 608 may represent a 50 MHz frequency shift, and each small antenna element 612 may represent a 20 MHz shift in frequency. The small antenna elements 612 may be used to fine-tune an antenna, for example, where the change in resonant frequency is less than 50 MHz. For example, a 1900 MHz antenna may be tuned to 1880 MHz by adding the small antenna element 612, to 1860 MHz by adding another small antenna element 612, etc. As another example, adding one large antenna element 608 to the 1900 MHz antenna tunes the antenna to 1850 MHz. (As explained with respect to FIGS. 4A-4C, the number of antenna elements 606 used to efficiently form an antenna is inversely related to the resonant frequency of that antenna.)

Ideally, if all of the antenna elements 606 are made smaller, a more finely-tuned antenna would result. However, this would dramatically increase the processing load of the antenna, as a larger number of elements 606 would be needed to cover the surface of the back housing 602. One preferred solution includes achieving a balance between size and processing efficiency. For example, in FIGS. 4A, 4B, and 4C, all of the antenna elements 606 may be a uniform size of two millimeters wide and two millimeters tall. As another example, in FIG. 6, the large antenna elements 608 may be two millimeters wide and two millimeters tall as well, but in order to improve antenna tuning capabilities, the small antenna elements 612 may be one millimeter wide and one millimeter tall.

To further minimize processing loads, in some embodiments, the antenna elements 606 may include a limited number of the small antenna elements 612 placed in advantageous locations. For example, the small elements 612 may be placed in specific areas of the back housing 602 that correspond to where antennas are expected to be formed and/or the locations of larger antenna volumes within the associated electronic device 600. For example, in FIG. 6, the small antenna elements 612 are placed adjacent to an outer perimeter 638 of the back housing 602, and the large antenna elements 608 occupy a central, majority portion of the back housing 602. As another example, in FIGS. 1A and 1B, the largest-sized elements 108 are placed across the center of the back housing 602, and the middle-sized elements 110 and smallest-sized elements 112 are placed near the top edge 130 and the bottom edge 132 of the back housing 102.

In some embodiments, the back housing 602 may be designed to accommodate only predefined antenna configurations. For example, instead of placing the switches 616 throughout the extent of the back housing 602, the switches 616 may be placed with specific antenna elements 606 that have been preselected for antenna formation, for example, based on preferred resonant frequencies and/or types of antenna structures. As another example, to promote optimal antenna placement, the switches 616 may be placed in areas corresponding to larger antenna volumes within the electronic device (e.g., near the bottom and top portions of the back housing 602). Selective placement of the switches can reduce the complexity of the antenna module and the overall cost of the device.

Figure 7:
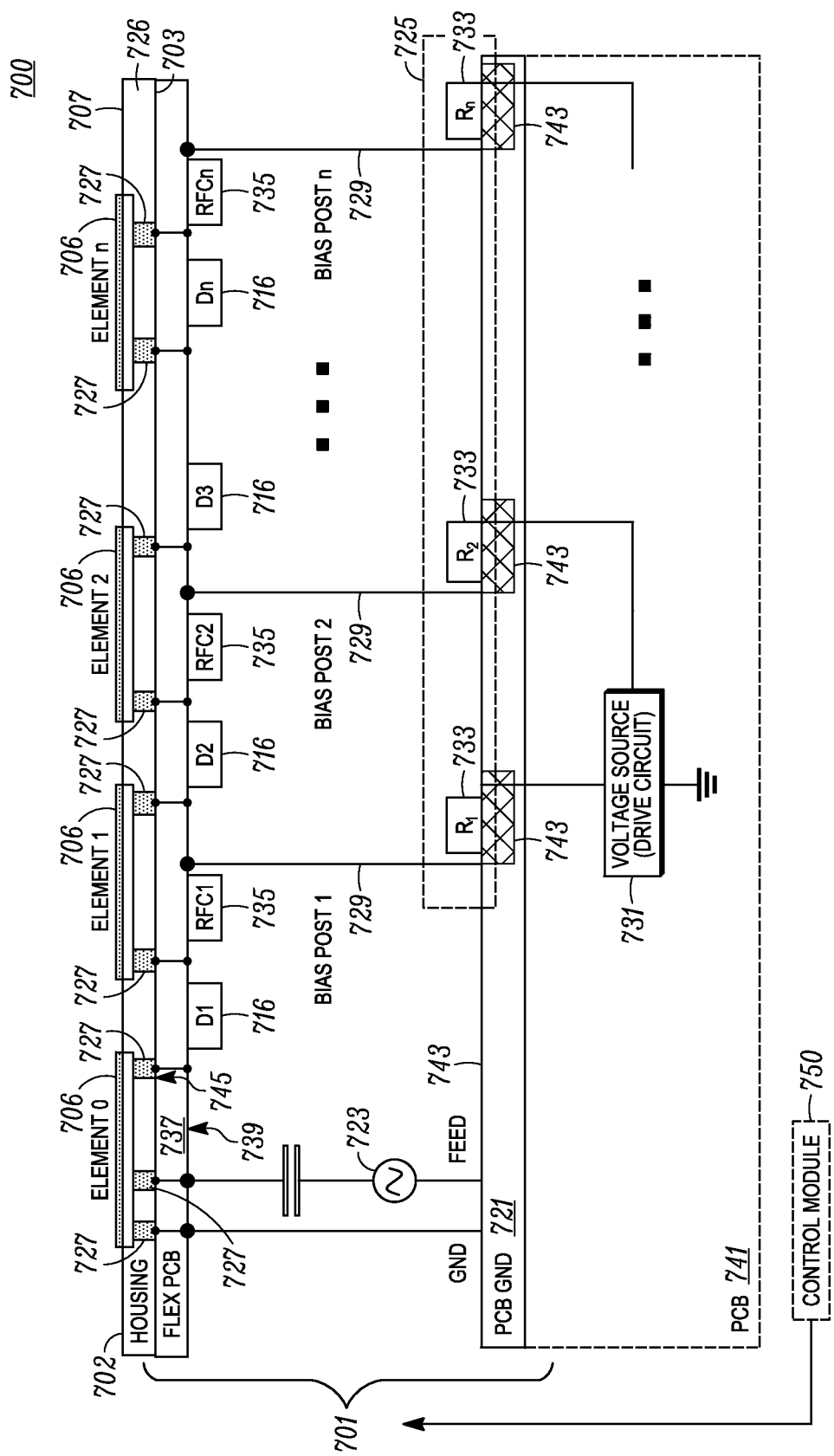
FIG. 7 illustrates a schematic of a cross-sectional view of example circuitry of an electronic device in accordance with some embodiments.

FIG. 7 depicts a cross-sectional schematic view of an example antenna switching circuit 701 for providing the switched antenna techniques disclosed herein. The antenna switching circuit 701 (also referred to herein as an antenna switching module) may be included in an electronic device 700. It should be appreciated that the electronic device 700, as depicted, is merely an example and can include various combinations of hardware and/or software components. According to some embodiments, the electronic device 700 may be a mobile computing device, such as, for example, a smartphone or any other type of mobile communications device, a tablet, an e-reader, a portable gaming device, a portable media player, a personal digital assistant, a laptop computer, a desktop computer, or any other mobile or electronic device that includes one or more wireless communication components. In FIG. 7, the electronic device 700 is a mobile device similar to one of the electronic devices 100, 200, 300, 400, 500, or 600.

As illustrated, the antenna switching circuit 701 is coupled to an inner surface 703 of a back housing 702 of the electronic device 700. In embodiments, the back housing 702 may represent one of the back housings 102, 202, 302, 402, 502, or 602 or a portion thereof. The back housing 702 includes a plurality of antenna elements 706 on an outer surface 707 of the back housing 702, opposite from the inner surface 703. In embodiments, the antenna elements 706 may represent any of the aesthetic elements 106, 206, 306, 406, 506, or 606. The antenna elements 706 may be composed of a conductive material, such as metal. The back housing 702 may further include a non-conductive shell 726 composed of a non-conductive material, such as plastic. The antenna elements 706 may be at least partially embedded into the non-conductive shell 726. For example, as shown, the antenna elements 706 may protrude from, or be raised above, the outer surface 707 of the back housing 702. In this regard, the antenna elements 706 may form three-dimensional structures on the back housing 702.

In embodiments, the antenna elements 706 can be arranged in rows and/or columns on the back housing 702. The cross-sectional view of FIG. 7 may represent any row or column of the antenna elements 706, where each row or column includes n+1 antenna elements 706, or Element 0, Element 1, Element 2, . . . , Element n. As shown in FIG. 7, each antenna element 706 can be electrically coupled to the antenna switching circuit 701 through one or more electrical contacts 727. The electrical contacts 727 may be at least partially embedded into the non-conductive shell 726 between the antenna elements 706 and the inner surface 703 of the back housing 702.

In embodiments, the antenna matching circuit 701 can include a plurality of switches 716 respectively coupled to at least one of the plurality of antenna elements 706 via the electrical contacts 727. By activating the appropriate switch (es) 716, the antenna switching circuit 701 can selectively connect two or more of the antenna elements 706 to an antenna feed 723, thereby forming an antenna for transmitting and/or receiving wireless communication signals from the coupled antenna elements 706. The switches 716 may include any type of switch technology that can be used in a mobile communication device, including for example, field-effect transistor (FET) switches, such as Gallium Arsenide (GaAs) and CMOS; mechanical switches, such as subminiature relays and micro-electromechanical (MEMS); PIN diodes; and varactors. In one embodiment, the switches 716 include PIN diode switches with two selectable stages, e.g., ON and OFF. In another embodiment, the switches 716 include MEMS switches. The reconfigurable antenna formed by coupling together two or more of the antenna elements 706 may be any suitable type of antenna, including, for example, a monopole antenna, a dual-arm monopole antenna, an inverted L-antenna, dual inverted-L antenna, inverted-F antenna, or hybrids of these antenna structures. In some embodiments, the antenna may be a substantially planar type of antenna, such as, e.g., a planar inverted-F antenna.

As shown in FIG. 7, according to embodiments, in each row or column of antenna elements 706, each of the Elements 1 . . . n is coupled to a respective one of n switches 716, or switches D1, D2, D3, . . . , Dn via a respective one of the electrical contacts 727. The Element 0 in each row or column is electrically coupled to a ground plane 721 (e.g., via a GND line) through one of the electrical contacts 727 and to the antenna feed 723 (e.g., via to FEED line) through another one of the electrical contacts 727. In embodiments, the return current associated with each row or column of the antenna elements 706 may be passed through the Element 0 to the ground plane 721 via the GND line. In some embodiments, the ground plane 721 may also serve as the ground plane for other circuitry in the electronic device 700. For example, in the illustrated embodiment, the ground plane 721 is part of a printed circuit board (PCB) 741 of the electronic device 700, as discussed in more detail below. The antenna feed 723 may be coupled to a signal source (not shown) of the electronic device 700. The signal source may be a transmitter, a receiver, or a transceiver (such as, e.g., cellular transceiver 963 in FIG. 9) for receiving and/or transmitting voice and/or data signals via one or more antenna(s) formed by the antenna elements 706. Other electronic components (not shown) may be coupled between the antenna elements 706 and the antenna switching circuit 701, including, for example, RLC circuitry, RF front end architecture, impedance matching network circuitry, etc.

Each of the switches D1, . . . , Dn can selectively couple a respective Element 1, . . . , n to the antenna feed 723 to form an antenna, or part of an antenna, where the antenna includes antenna elements 706 from one or more columns or rows (e.g., as shown in FIGS. 5 and 6). As shown, the Elements 1, . . . , n are coupled to the switches D1, . . . , Dn in succession. Thus, in order to form an antenna including, for example, the Elements 1 through n, each of the switches D1, . . . , Dn may be activated (e.g., turned ON) in order to connect the Element n, and each Element successively prior to the Element n, to the antenna feed 723. As another example, in order to form an antenna by connecting the Elements 1 and 2 to the antenna feed 723, the switches D2 and D1 may be activated, such that the switch D2 couples the Element 2 to the Element 1 and the switch D1 couples the Element 1 to the Element 0, which is connected to the antenna feed 723.

The antenna switching circuit 701 further includes a biasing module 725 configured to selectively apply a bias voltage to one or more of the plurality of switches 716 in order to activate or turn ON the switch(es) 716. In embodiments, the biasing module 725 can be coupled to the switches 716 via a plurality of bias posts 729 (also referred to herein as electrical posts) included in the antenna switching circuit 701. In embodiments, the biasing module 725 includes a voltage source 731 (also referred to herein as a drive circuit) configured to provide a bias voltage to each switch 716 through the bias posts 729. In some embodiments, the biasing module 725 further includes a plurality of bias resistors 733 configured to regulate the voltage applied to each switch 716. Each of the bias posts 729 may be coupled to a respective one of the bias resistors 733.

Further, in embodiments, the antenna switching circuit 701 includes a plurality of radio frequency chokes (RFC) 735 configured to block wireless communication signals received and/or transmitted by the antenna elements 706 from entering the biasing module 725 and/or the bias posts 729. Each radio frequency choke 735 may be coupled between a respective switch 716 and a respective bias post 729 to help inhibit the antenna elements 706 from coupling to the bias posts 729. As shown in FIG. 7, in each row or column of antenna elements 706, each of the switches D1, . . . , Dn may be coupled to a respective one of the radio frequency chokes 735, or chokes RFC1, RFC2, . . . , RFCn, and each of the chokes RFC1, . . . , RFCn may be coupled to a respective one of the bias posts 1, 2, . . . , n. In embodiments, each of the radio frequency chokes 735 can be configured to have a self resonant frequency that provides a high impedance at a predefined frequency. The predefined frequency may be determined by various characteristics of the antenna switching circuit 701, including, for example, a resonant frequency of the antenna element 706 coupled to the choke 735 via the switch 716.

Figure 8:
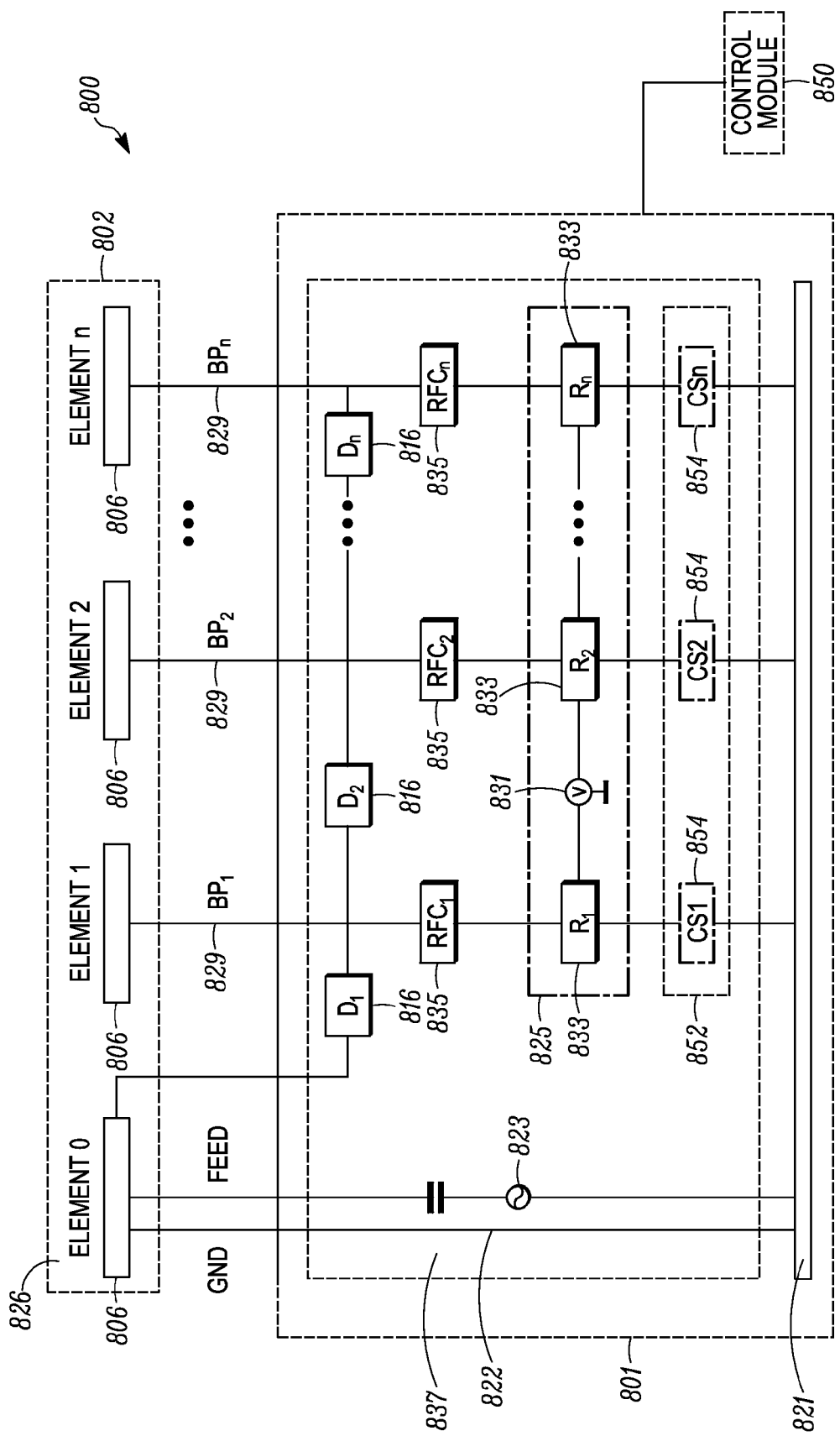
FIG. 8 illustrates a schematic of example circuitry in an electronic device in accordance with some embodiments.

In embodiments, the antenna switching circuit 701 can be further configured to reduce detuning of the antenna formed by the coupled antenna elements by placing the bias posts 729 in vertical alignment between the antenna elements 706 and the ground plane 721. Specifically, the vertical placement of the bias posts 729 can help limit coupling between the antenna elements 706 and the bias posts 729. In some such embodiments, the antenna switching circuit 701 may include a first circuit board 737 that houses the switches 716 and the radio frequency chokes 735 on a first surface 739 of the circuit board 737. The first circuit board 737 and the printed circuit board 741 (also referred to herein as the second circuit board) may be planar boards positioned in parallel to each other, so that a first surface 743 of the circuit board 741, which includes the ground plane 721, lies parallel to and below the first surface 739 of the first circuit board 737. As shown in FIG. 7, one end of each bias post 729 can be coupled to the first surface 739 of the first circuit board 737, while an opposite end of the bias post 729 can be coupled to the ground plane 721 of the second circuit board 741. In other embodiments, the antenna switching module may include a single circuit board configured to carry the switches 716, the chokes 735, the biasing module 725, and the bias posts 729 (for example, as shown in FIG. 8).

In some embodiments, the bias posts 729 are pogo pins for enabling a vertically aligned connection between the two circuit boards 737 and 741. Further, in some embodiments, the ground plane 721 may include a built-in ground relief 743 at each connection point between the bias posts 729 and the ground plane 721 in order to reduce capacitance between the bias posts 729 and ground. As an example, the ground relief 743 may be "keepout" areas of the second circuit board 741 that do not include conductive elements, such as, e.g., copper lines, electronic components, etc.

In some embodiments, the first circuit board 737 may be a rigid circuit positioned below the back housing 702 and, for example, above the second circuit board 741 within the electronic device 700. In other embodiments, the first circuit board 737 may be a flexible circuit positioned below, or coupled to the inner surface 703 of, the back housing 702. In one such embodiment, the flexible circuit 737 may be positioned relative to predetermined areas of the back housing 702 that correspond to a number of antenna elements 706 preselected for antenna formation. For example, the flexible circuit 737 may be placed in the areas that are optimal for antenna placement, such as, e.g., adjacent to the larger antenna volumes of the electronic device 700. In another embodiment, the flexible circuit 737 may be placed only under unused antenna elements 706, or the aesthetic elements 106 that are not preselected for antenna formation. In such embodiment, the bias posts 729 may be planar, or placed horizontally, relative to the antenna elements 706. In this case, such horizontal placement may not cause undesirable coupling between the antenna elements 706 and the bias posts 729, because the bias posts 729 do not cross over, or otherwise interfere with, the antenna elements 706 used for antenna formation.

In the illustrated embodiment, the biasing module 725 is shown as being included on the second circuit board 741. However, in other embodiments, the biasing module 725 may be included on the first circuit board 737. In one embodiment, the biasing module 725 may be positioned on the first surface 739 of the first circuit board 737, and the switches 716 and chokes 735 may be positioned on a second surface 745 of the first circuit board 737. In such embodiment, the bias posts 729 may be vertically aligned between the antenna elements 706 and the ground plane 721. For example, the bias posts 729 may connect to the chokes 735 on the first surface 739 at a first end of the posts 729, pass through openings in the first circuit board 737, couple to the bias resistors 733 on the second surface 745, and then connect to the ground plane 721 at an opposite end of the posts 729.

In some embodiments, the antenna switching circuit 701 may form part of a wireless communication circuitry (not shown) included in the electronic device 700. The wireless communication circuitry may be configured to operate in the plurality of frequency bands covered by the electronic device 700 and pass signals to, and/or receive signals from, the antenna(s) formed by the antenna elements 706. The wireless communication circuitry may include, for example, a plurality of amplifiers, power inverters, filters, switches, matching networks (e.g., including one or more resisters, inductors, and/or capacitors), and other components typically found in the radio frequency (RF) front-end architecture of a mobile communications device.

In embodiments, the electronic device 700 may further include a control module 750 configured to send a control signal to the antenna switching circuit 701 to control operation of the switches 716 and thereby, couple together the antenna elements 706 so as to form an antenna resonant at a specific operating band. In some embodiments, the wireless communication circuitry of the electronic device 700 and/or the control module 750 may determine which frequency band(s) to use for transmitting and/or receiving signals via an antenna of the electronic device 700 based on, for example, information received by the antenna from one or more wireless communication system(s) (e.g., base station and/or access point infrastructure) regarding spectral availability, region-specific information, signal strength, carrier information, etc. In one embodiment, the wireless communication circuitry may make this determination and provide the frequency information to the control module 750, and the control module 750 may formulate the control signal based thereon.

In some embodiments, based on the frequency information, the control module 750 may determine which antenna elements 706 to couple together to form an antenna resonant at that operating band using the techniques disclosed herein. For example, if the antenna elements 706 include different-sized elements (e.g., the large and small elements as shown in FIG. 6), the control module 750 may be configured to determine the size(s) of the antenna elements 706, in addition to the total number of elements 706 and their relative positions, when selecting antenna elements 706 for antenna formation. In some embodiments, the control module 750 may select certain antenna elements 706 based on the type of antenna to be formed (e.g., inverted-F, dual-inverted L, etc.). Based on the selected elements 706, the control module 750 may generate a control signal that instructs the antenna switching circuit 701 to activate the switches 716 that correspond to, or are coupled to, the selected antenna elements 706. In some embodiments, configurations for forming antennas resonant at specific frequency bands may be predetermined and stored in a memory of the electronic device 700 and accessed by the control module 750 in order to generate the control signals.

In embodiments, the control module 750 may be included on the second circuit board 741. The control module 750 may be any type of integrated circuit capable of generating and/or providing one or more control signal(s) to the antenna switching circuit 701. According to some embodiments, the control module 750 may include, or be included within, a processer (such as, e.g., a digital signal processor, a microcontroller, a microprocessor, etc.), a modem, a modulator, a demodulator, and/or a power management unit. The one or more control signal(s) provided by the control module 750 to the antenna switching circuit 701 may be a control logic signal (e.g., "0", "1", low, high, etc.), an MIPI (Mobile Industry Processor Interface) control signal (e.g., including a clock signal and a data signal), or any other type of control signal.

In some embodiments, the antenna switching circuit 701 may further include a capacitive sensing module (for example, capacitive sensing module 852 in FIG. 8). The capacitive sensing module may be configured to sense placement of a hand near one or more of the antenna elements 706 and adjust the antenna configuration accordingly, as discussed in more detail below. In some embodiments, the capacitive sensing module may be included on the first circuit board 737 along with the switches 716, the chokes 735, and/or the biasing module 725. In other embodiments, the capacitive sensing module may be included on the second circuit board 741.

Referring now to FIG. 8, shown is a schematic view of an example antenna switching circuit 801 for providing the switched antenna techniques disclosed herein. The antenna switching circuit 801 (also referred to herein as an antenna switching module) may be included in an electronic device 800. It should be appreciated that the electronic device 800, as depicted, is merely an example and can include various combinations of hardware and/or software components. According to some embodiments, the electronic device 800 may be a mobile computing device, such as, for example, a smartphone or any other type of mobile communications device, a tablet, an e-reader, a portable gaming device, a portable media player, a personal digital assistant, a laptop computer, a desktop computer, or any other mobile or electronic device that includes one or more wireless communication components. In FIG. 8, the electronic device 800 is a mobile device similar to one of the electronic devices 100, 200, 300, 400, 500, or 600.

As illustrated, the antenna switching circuit 801 is coupled to a back housing 802 of the electronic device 800. In embodiments, the back housing 802 may represent one of the back housings 102, 202, 302, 402, 502, or 602 described earlier. The back housing 802 includes a plurality of antenna elements 806. In embodiments, the antenna elements 806 may represent any of the aesthetic elements 106, 206, 306, 406, 506, or 606. The antenna elements 806 may be composed of a conductive material, such as metal. The back housing 802 may further include a non-conductive shell 826 composed of a non-conductive material, such as plastic.

In embodiments, the antenna elements 806 can be arranged in rows and/or columns on the back housing 802. FIG. 8 may represent any row or column of the antenna elements 806, where each row or column includes n+1 antenna elements 806, or Element 0, Element 1, Element 2, . . . , Element n. Each antenna element 806 can be electrically coupled to the antenna switching circuit 801. In particular, the antenna matching circuit 801 can include a plurality of switches 816 respectively coupled to at least one of the plurality of antenna elements 806. By activating the appropriate switch(es) 816, the antenna switching circuit 801 can selectively connect two or more of the antenna elements 806 to an antenna feed 823, thereby forming an antenna for transmitting and/or receiving wireless communication signals from the coupled antenna elements 806. The switches 816 may include any type of switch technology that can be used in a mobile communication device, including for example, field-effect transistor (FET) switches, such as Gallium Arsenide (GaAs) and CMOS; mechanical switches, such as subminiature relays and micro-electromechanical (MEMS); PIN diodes; and varacters. The antenna formed by coupling together two or more of the antenna elements 806 may be any suitable type of antenna, including, for example, a monopole antenna, a dual-arm monopole antenna, an inverted L-antenna, dual inverted-L antenna, inverted-F antenna, or hybrids of these antenna structures.

As shown in FIG. 8, according to embodiments, in each row or column of antenna elements 806, each of the Elements 1, . . . , n is coupled to a respective one of n switches 816, or switches 816 D1, D2, . . . , Dn. The Element 0 in each row or column is electrically coupled to a ground plane 821 (e.g., via a GND line 822) and to the antenna feed 823 (e.g., via the FEED line). In embodiments, the return current associated with each row or column of the antenna elements 806 may be passed through the Element 0 to the ground plane 821 through the GND line. In some embodiments, the ground plane 821 may also serve as the ground plane for other circuitry in the electronic device 800. The antenna feed 823 may be coupled to a signal source (not shown) of the electronic device 800. The signal source may be a transmitter, a receiver, or a transceiver (such as, e.g., cellular transceiver 963 in FIG. 9) for receiving and/or transmitting voice and/or data signals via one or more antenna(s) formed by the antenna elements 806. Other electronic components (not shown) may be coupled between the antenna elements 806 and the antenna switching circuit 801, including, for example, RLC circuitry, RF front end architecture, impedance matching network circuitry, etc.

Each of the switches D1, . . . , Dn can selectively couple a respective Element 1, . . . , n to the antenna feed 823 to form an antenna, or part of an antenna, where the antenna includes antenna elements 806 from one or more columns or rows (e.g., as shown in FIGS. 5 and 6). As shown, the Elements 1, . . . , n are coupled to the switches D1, . . . , Dn in succession. Thus, in order to form an antenna including, for example, the Elements 1 through n, each of the switches D1, . . . , Dn may be activated (e.g., turned ON) in order to connect the Element n, and each element successively prior to the Element n, to the antenna feed 823. As another example, in order to form an antenna by connecting the Elements 1 and 2 to the antenna feed 823, the switches D2 and D1 may be activated, such that the switch D2 couples the Element 2 to the Element 1 and the switch D1 couples the Element 1 to the Element 0, which is connected to the antenna feed 823.

The antenna switching circuit 801 further includes a biasing module 825 configured to selectively apply a bias voltage to one or more of the plurality of switches 816 in order to activate or turn ON the switch(es) 816. In embodiments, the biasing module 825 can be coupled to the switches 816 via a plurality of bias posts 829 (also referred to herein as electrical posts) included in the antenna switching circuit 801. In embodiments, the biasing module 825 includes a voltage source 831 (also referred to herein as a drive circuit) configured to provide the bias voltage to each switch 816 through the bias posts 829. In some embodiments, the biasing module 825 further includes a plurality of bias resistors 833 configured to regulate the voltage applied to each switch 816. Each of the bias posts 829 may be coupled to a respective one of the bias resistors 833.

Further, in embodiments, the antenna switching circuit 801 includes a plurality of radio frequency chokes (RFC) 835 configured to block wireless communication signals received and/or transmitted by the antenna elements 806 from entering the biasing module 825 and/or the bias posts 829. Each radio frequency choke 835 may be coupled to a respective switch 816 and a respective bias post 829 to help deter the antenna elements 806 from coupling to the bias posts 829. As shown in FIG. 8, in each row or column of antenna elements 806, each of the switches D1, D2, . . . , Dn may be coupled to a respective one of the radio frequency chokes 835, or chokes RFC1, RFC2, . . . , RFCn, and each of the chokes RFC1, RFC2, . . . , RFCn may be coupled to a respective one of the bias posts 829 BP1, BP2, . . . , BPn. In embodiments, each of the radio frequency chokes 835 can be configured to have a self resonant frequency that provides a high impedance at a predefined frequency. The predefined frequency may be determined by various characteristics of the antenna switching circuit 801, including, for example, a resonant frequency of the antenna element 806 coupled to the choke 835 via the switch 816.

In embodiments, the antenna switching circuit 801 can be further configured to reduce detuning of the antenna formed by the coupled antenna elements 806 by placing the bias posts 829 in vertical alignment between the antenna elements 806 and the ground plane 821. Specifically, the vertical placement of the bias posts 829 can help limit coupling between the antenna elements 806 and the bias posts 829. In some embodiments, the bias posts 829 are pogo pins for enabling a vertically aligned connection. In some embodiments, the ground plane 821 may include a built-in ground relief (for example, ground relief 743 in FIG. 7) at each connection point between the bias posts 829 and the ground plane 821 in order to reduce capacitance between the bias posts 829 and ground. As an example, the ground relief may be "keepout" areas of the circuit board that do not include conductive elements, such as, e.g., copper lines, electronic components, etc.

In some embodiments, the antenna switching circuit 801 may include two planar circuit boards (not shown), for example, a first circuit board for carrying the switches 816 and the radio frequency chokes 835, and a second circuit board for carrying the biasing module 825 and the ground plane 821 (e.g., as shown in FIG. 7). In such embodiments, the two circuit boards may be positioned in parallel to each other, and one end of each bias post 829 can be coupled to the first circuit board, while an opposite end of the bias post 829 can be coupled to the ground plane 821 of the second circuit board.

In other embodiments, for example, as shown in FIG. 8, the antenna switching circuit 801 may include a single circuit board 837 configured to carry the switches 816, the chokes 835, the biasing module 825, and the bias posts 829. The circuit board 837 may be positioned in parallel to the ground plane 821, and the bias posts 829 may be vertically aligned between the circuit board 837 and the ground plane 821. In some embodiments, the circuit board 837 may be a rigid circuit positioned below the back housing 802 within the electronic device 800, for example, above the ground plane 821. In one such embodiment, the circuit board 837 may include the ground plane 821. In other embodiments, the circuit board 837 may be a flexible circuit positioned below the back housing 802.

In some embodiments, the chokes 835 and the switches 816 may be positioned on a first surface (not shown) of the circuit board 837, and the biasing module 825 may be positioned on a second surface of the circuit board 837, wherein the second surface is coupled to the ground plane 821. In such embodiments, the bias posts 829 may be vertically aligned between the antenna elements 806 and the ground plane 821 by passing the bias posts 829 through the circuit board 837. For example, a first end of each bias post 829 may be coupled to a respective choke 835 on the first surface of the circuit board 837. The bias post 829 may pass through openings in the circuit board 837 and couple to a respective bias resistor 833 on the second surface of the circuit board 837. And finally, an opposite end of the post 829 may be coupled to the ground plane 821.

In some embodiments, the antenna switching circuit 801 may form part of a wireless communication circuitry (not shown) included in the electronic device 800. The wireless communication circuitry may be configured to operate in the plurality of frequency bands covered by the electronic device 800 and pass signals to, and/or receive signals from, the antenna(s) formed by the antenna elements 806. The wireless communication circuitry may include, for example, a plurality of amplifiers, power inverters, filters, switches, matching networks (e.g., including one or more resisters, inductors, and/or capacitors), and other components typically found in the radio frequency (RF) front-end architecture of a mobile communications device.

In embodiments, the electronic device 800 may further include a control module 850 configured to send a control signal to the antenna switching circuit 801 to control operation of the switches 816 and thereby, couple together the antenna elements 806 so as to form an antenna resonant at a specific operating band. In some embodiments, the wireless communication circuitry of the electronic device 800 and/or the control module 850 may determine which frequency band(s) to use for transmitting and/or receiving signals via an antenna of the electronic device 800 based on, for example, information received by the antenna from one or more wireless communication system(s) (e.g., base station and/or access point infrastructure) regarding spectral availability, region-specific information, signal strength, carrier information, etc. In one embodiment, the wireless communication circuitry may make this determination and provide the frequency information to the control module 850, and the control module 850 may formulate the control signal based thereon.

In some embodiments, based on the frequency information, the control module 850 may determine which antenna elements 806 to couple together to form an antenna resonant at that operating band using techniques disclosed herein. Based on the identified elements 806, the control module 850 may generate a control signal that instructs the antenna switching circuit 801 to activate the switches 816 that correspond to, or are coupled to, the identified antenna elements 806. In some embodiments, the control module 850 may select certain antenna elements 806 based on the type of antenna to be formed (e.g., inverted-F, dual-inverted L, etc.).

In embodiments, the control module 850 may be included on the circuit board 837. The control module 850 may be any type of integrated circuit capable of generating and/or providing one or more control signal(s) to the antenna switching circuit 801. According to some embodiments, the control module 850 may include, or be included within, a processer (such as, e.g., a digital signal processor, a microcontroller, a microprocessor, etc.), a modem, a modulator, a demodulator, and/or a power management unit. The one or more control signal(s) provided by the control module 850 to the antenna switching circuit 801 may be a control logic signal (e.g., "0", "1", low, high, etc.), an MIPI (Mobile Industry Processor Interface) control signal (e.g., including a clock signal and a data signal), or any other type of control signal.

In some embodiments, the antenna switching circuit 801 may further include a capacitive sensing module 852, as shown in FIG. 8. The capacitive sensing module 852 may be configured to sense placement of a hand proximate to one or more of the antenna elements 806 used to form an antenna and to cause an automatic adjustment of the antenna configuration around the hand. For example, if the antenna elements 806 are coupled to form a 700 MHz antenna (e.g., as shown in FIG. 4A) and a hand is detected proximate to a lower left corner of the back housing 802, the antenna may be reconfigured by deactivating the switches 816 connected to the antenna elements 806 near the hand and activating additional switches 816 connected to antenna elements 806 that are above and/or to the right of the hand.

The capacitive sensing module 852 may include a plurality of capacitive sensors 854 respectively coupled to the plurality of antenna elements 806. For example, as shown in FIG. 8, in each row or column of antenna elements 806, each of the Elements 1 . . . n may be coupled to a respective one of capacitive sensors CS1, CS2, . . . CSn. In some embodiments, the capacitive sensing module may be included on the circuit board 837 along with the switches 816, the chokes 835, and/or the biasing module 825, as shown in FIG. 8.

In embodiments, the capacitive sensing module 852 may communicate with the control module 850 in order to reconfigure the antenna. For example, upon detecting a hand placement proximate to one or more antenna elements 806, the capacitive sensing module 852 may send a signal to the control module 850 indicating the hand placement and/or an identification of the antenna element(s) 806 proximate to the hand. In response to the signal from the capacitive sensing module 852, the control module 850 may send a control signal to the antenna switching circuit 801 to deactivate each switch 816 coupled to the antenna elements 806 proximate to the hand. Further, the control module 850 may send a control signal to the antenna switching circuit 801 to activate one or more new switches 816 in order to reconfigure the antenna around the hand placement. In embodiments, alternative configurations for forming the antenna may be predetermined and stored in a memory of the electronic device 800 and accessed by the control module 850 in order to generate control signals for performing the reconfiguration.

Figure 9:
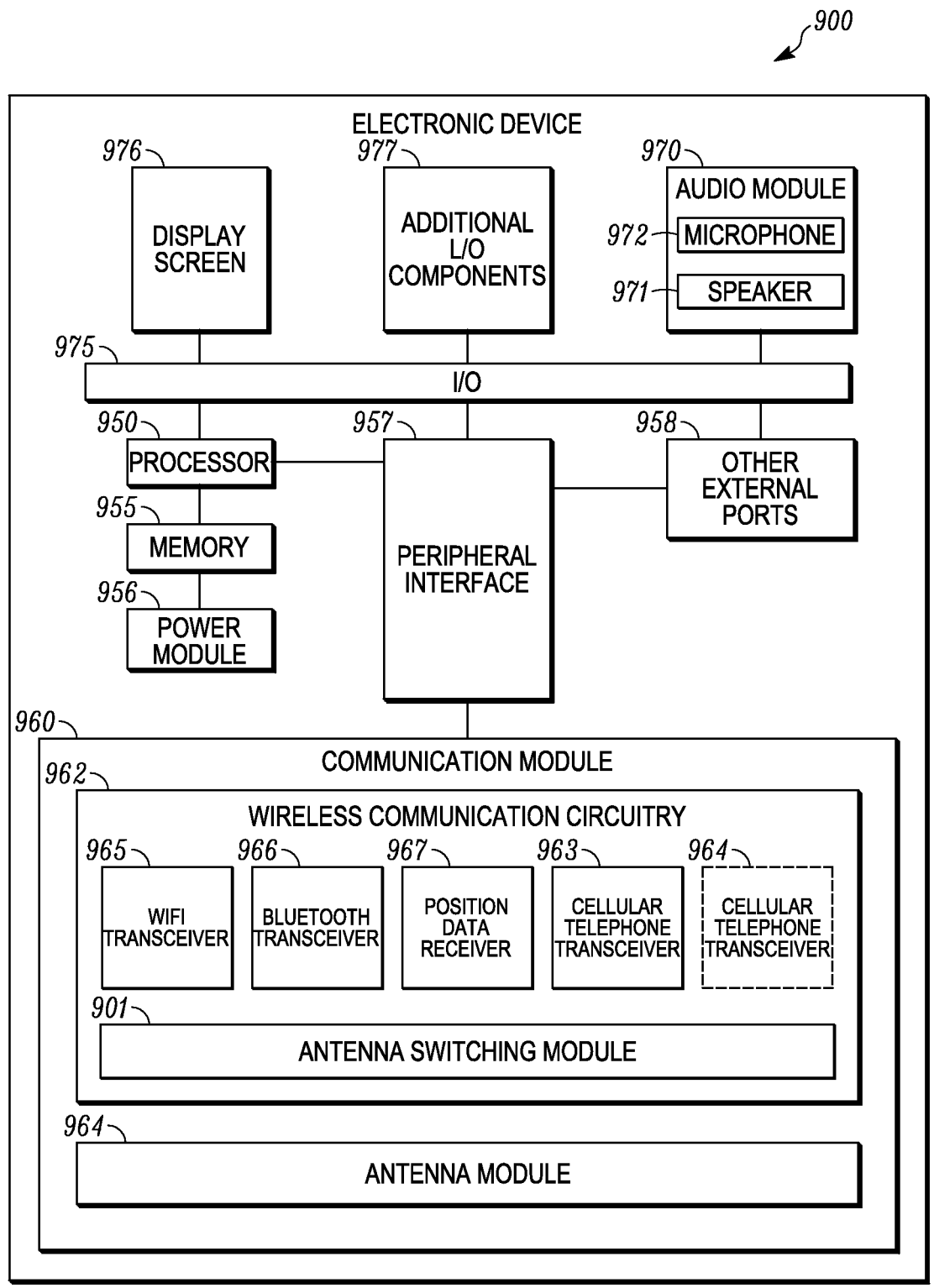
FIG. 9 is a block diagram of an example electronic device including an antenna module and wireless communication circuitry in accordance with some embodiments.

Referring now to FIG. 9, shown is an example electronic device 900 in which some embodiments may be implemented. The electronic device 900 can include a processor 950 (such as, e.g., the control module 750 or 850), a memory 955 (e.g., hard drives, flash memory, MicroSD cards, and others), a power module 956 (e.g., batteries, fuel cells, wired or wireless charging circuits, etc.), a peripheral interface 957, and one or more external ports 958 (e.g., Universal Serial Bus (USB), HDMI, Firewire, and/or others). The memory 955 can have a distributed architecture where various components are situated remote from one another, but are still accessed by the processor 950. These other components may reside on devices located elsewhere on a network or in a cloud arrangement.

The electronic device 900 can further include a communication module 960 coupled to the peripheral interface 957. The communication module 960 may include wireless communication circuitry 962 and an antenna module 964. According to some embodiments, the antenna module 964 may include a plurality of connectable antenna elements (not shown) as discussed herein. The wireless communication circuitry 962 may include an antenna switching module 901 (e.g., similar to antenna switching circuit 701 or 801). According to some embodiments, the antenna switching module 901 may include one or more switches (not shown) that may be selectively coupled to the antenna elements in the antenna module 964.

The wireless communication circuitry 962 can include one or more transceivers functioning in accordance with IEEE standards, 3GPP standards, or other standards, and configured to receive and transmit data via the one or more external ports 958. The wireless communication circuitry 962 may include one or more WWAN transceivers (such as, e.g., cellular telephone transceivers 963 and 964) configured to communicate with a wide area network, including one or more cell sites or base stations to communicatively connect the electronic device 900 to additional devices or components. Further, the wireless communication circuitry 962 can include one or more WLAN and/or WPAN transceivers, such as WiFi transceiver 965 and Bluetooth transceiver 966 that are configured to connect the electronic device 900 to local area networks and/or personal area networks, such as a WiFi network and/or a Bluetooth network. In addition, the wireless communication circuitry 962 can include one or more position data receiver 967 that are configured to obtain position-related data, or GPS coordinates, from a position data network, such the GPS system. Still further, the wireless communication circuitry 962 can include one or more point-to-point transceivers (not shown) configured to connect the electronic device 900 short-range communication networks, such as, e.g., near-field-communication (NFC) and/or radio frequency identification (RFID).

The electronic device 900 may also include an audio module 970 including hardware components such as a speaker 971 for outputting audio and a microphone 972 for receiving audio. In some embodiments, the speaker 971 and the microphone 972 can be piezoelectric components. The electronic device 900 can further include an input/output (I/O) controller 975, a display screen 976, and additional I/O components 977 (e.g., capacitors, keys, buttons, lights, LEDs, cursor control components, haptic components, touch-sensitive components, and others). The display screen 976, the audio module 970, and the additional I/O components 977 may be considered to form portions of a user interface (e.g., portions of the electronic device 900 associated with presenting information to the user and/or receiving inputs from the user).

Figure 10:
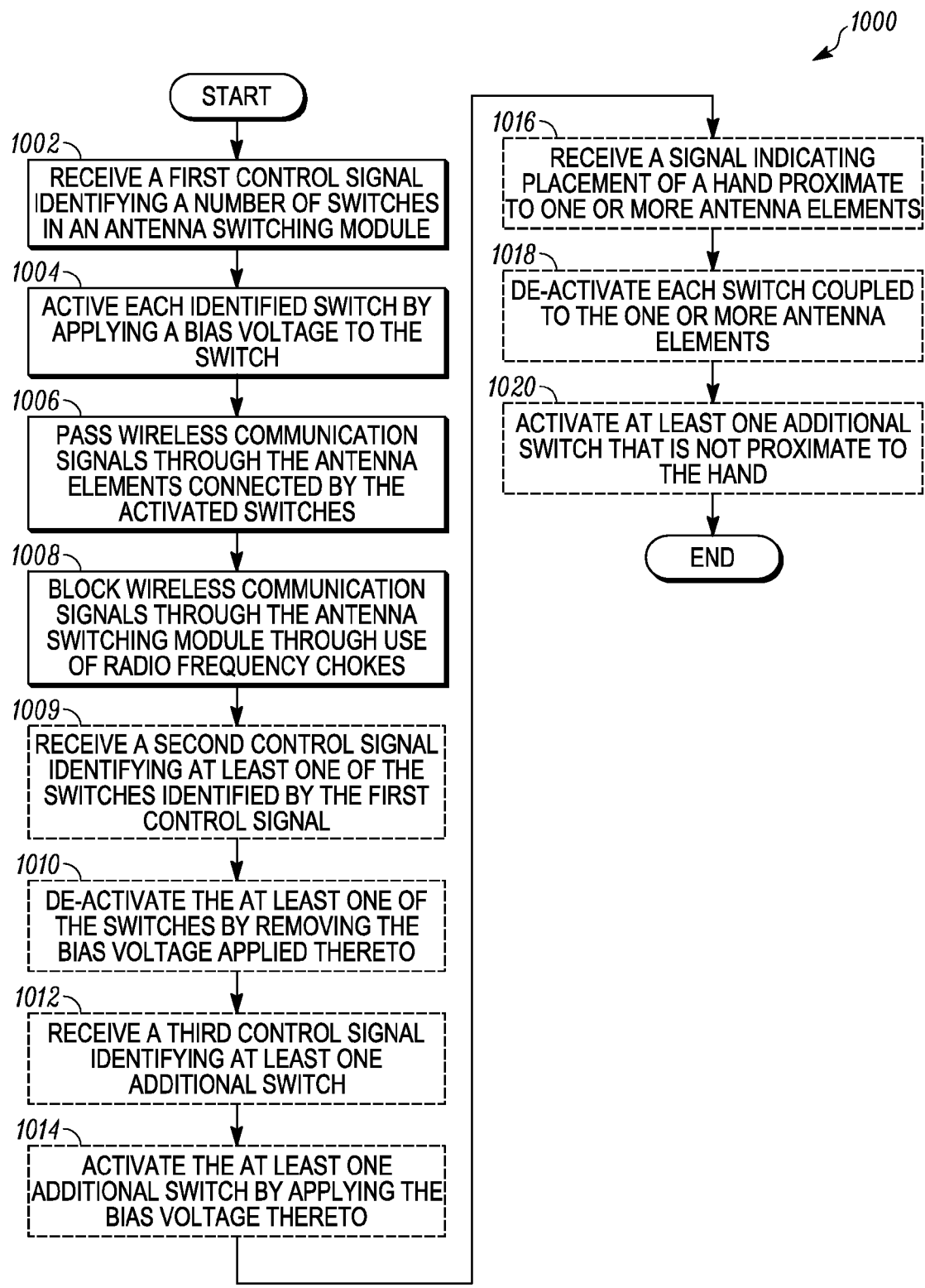
FIG. 10 is a flow diagram depicting control of a reconfigurable antenna in accordance with some embodiments.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 950 (e.g., working in connection with an operating system) to implement a method for selectively configuring an antenna for an electronic device from a plurality of discrete antenna elements, as described below with reference to FIG. 10. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

FIG. 10 is a flowchart of a method 1000 for controlling functions associated with selectively configuring an antenna for an electronic device (e.g., the electronic device 700, 800) from a plurality of discrete antenna elements (e.g., the antenna elements 706, 806) included on a back housing (e.g., the back housing 702, 802) the electronic device. The electronic device may further include a control module (e.g., the control module 750, 850) and an antenna switching module (e.g., the antenna switching circuit 701, 801) including a plurality of switches (e.g., the switches 716, 816), each switch being selectively coupled to two or more antenna elements. It is understood that the order of the steps of the depicted flowchart of FIG. 10 can be in any order, and certain ones can be eliminated, and/or certain other ones can be added depending upon the implementation.

The method 1000 begins at step 1002, where a first control signal is received from the control module identifying a number [and location?] of the switches included in the antenna switching module. The number of switches may be determined based on an operating band of the electronic device. The method 1000 further includes step 1004, which includes activating each switch identified by the first control signal by applying a bias voltage to each switch using a biasing module (e.g., the biasing module 725, 825) included in the antenna switching module. Activation of the switch forms a connection between the two or more antenna elements coupled to the switch, thereby forming the antenna.

At step 1006, wireless communication signals having frequencies within the operating band are passed through the antenna elements coupled by the identified switches. The method 1000 further includes step 1008, where the wireless communication signals are blocked from entering the antenna switching module using a plurality of radio frequency chokes (e.g., the radio frequency chokes 735, 835) respectively coupled to the plurality of switches. In some embodiments, the operating band of the electronic device includes any one of the Americas LTE bands. In one embodiment, the coupled antenna elements form a planar antenna. In one embodiment, the coupled antenna elements form an inverted-F antenna. In another embodiment, the coupled antenna elements form a dual-inverted L antenna.

In some embodiments, the method 1000 may further include step 1009, where a second control signal is received from the control module identifying at least one of the one or more switches identified by the first control signal. The second control signal may be generated to increase the operating band of the electronic device. At step 1010, the method 1000 includes deactivating the at least one switch identified by the second control signal by removing the bias voltage applied to the at least one switch, thereby decreasing the number of coupled antenna elements forming the antenna. In embodiments, the plurality of antenna elements includes a plurality of small antenna elements and a plurality of large antenna elements, and connecting two large antenna elements causes a larger change in the operating band of the electronic device than connecting two small antenna elements.

In some embodiments, the method 1000 includes step 1012, where a third control signal is received from the control module identifying at least one switch in addition to the one or more switches identified by the first control signal. The third control signal may be generated to decrease the operating band of the electronic device. At step 1014, the at least one switch identified by the third control signal is activated by applying the bias voltage to the at least one additional switch, thereby increasing the number of coupled antenna elements forming the antenna.

In some embodiments, the method 1000 also includes step 1016, which includes receiving a signal indicating placement of a hand proximate to one or more of the plurality of antenna elements, for example, from the capacitive sensing module 852. At step 1018, the method 1000 includes de-activating each switch coupled to the one or more antenna elements.

And at step 1020, the method 1000 includes activating at least one additional switch that is not proximate to the hand, thereby causing reconfiguration of the antenna to reduce detuning caused by the hand placement.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An electronic device, comprising:
    a back housing at least partially formed from a plurality of discrete antenna elements; and
    an antenna switching module for selectively coupling two or more of the plurality of discrete antenna elements to an antenna feed, the coupled antenna elements forming an antenna for transmitting and/or receiving wireless communication signals, wherein the antenna switching module includes:
        a plurality of switches, each switch being configured to selectively couple two of the plurality of discrete antenna elements,
        a plurality of electrical posts, each electrical post being coupled to at least one of the plurality of switches,
        a plurality of radio frequency chokes, each radio frequency choke being coupled to a respective one of the plurality of electrical posts, and
        a biasing module coupled to each of the plurality of radio frequency chokes, the biasing module being configured to selectively apply a bias voltage to one or more of the plurality of switches through the plurality of electrical posts coupled thereto,
    wherein the plurality of radio frequency chokes are configured to block the wireless communication signals from entering the biasing module.

2. The electronic device of claim 1, wherein the antenna switching module further includes a circuit board including, on a first surface, at least the plurality of switches and the plurality of radio frequency chokes.

3. The electronic device of claim 2, wherein the circuit board further includes the biasing module.

4. The electronic device of claim 2, wherein the circuit board further includes a second surface opposite from the first surface, the second surface being coupled to a ground plane.

5. The electronic device of claim 4, wherein the plurality of electrical posts are vertically aligned between the first surface of the circuit board and the ground plane.

6. The electronic device of claim 2, wherein the circuit board is a flexible circuit board.

7. The electronic device of claim 1, further including: a control module configured to provide a control signal indicating at least one switch to be connected by the antenna switching module.

8. The electronic device of claim 1, wherein the biasing module includes:
    a voltage source configured to provide the bias voltage, and
    a plurality of bias resistors configured to regulate the bias voltage applied to each switch.

9. The electronic device of claim 1, wherein the plurality of switches includes micro-electro-mechanical systems switches.

10. The electronic device of claim 1, further comprising: a capacitive sensing module for sensing placement of a hand proximate to one or more antenna elements.

11. The electronic device of claim 10, wherein the antenna switching module further includes at least a portion of the capacitive sensing module.

12. The electronic device of claim 1, wherein the plurality of discrete antenna elements are arranged to create a mosaic pattern on the back housing.

13. The electronic device of claim 1, wherein the plurality of discrete antenna elements are uniform in shape and non-uniform in size and/or spacing.

14. The electronic device of claim 1, wherein the plurality of discrete antenna elements includes a plurality of small antenna elements and a plurality of large antenna elements.

15. The electronic device of claim 14, wherein the plurality of small antenna elements are arranged along an outer perimeter of the back housing.

16. The electronic device of claim 15, wherein the plurality of large antenna elements are arranged within the outer perimeter of the back housing.

17. The electronic device of claim 1, wherein the coupled antenna elements form a planar antenna.

18. The electronic device of claim 17, wherein the coupled antenna elements form an inverted-F antenna.

19. The electronic device of claim 17, wherein the coupled antenna elements form a dual-inverted L antenna.

20. A method of selectively configuring an antenna for an electronic device from a plurality of discrete antenna elements, the plurality of discrete antenna elements forming at least a portion of a back housing of the electronic device, the electronic device further including a control module and an antenna switching module including a plurality of switches, each switch being selectively coupled to two or more antenna elements, the method comprising:
    receiving a first control signal from the control module identifying a number of the plurality of switches included in the antenna switching module, the number being determined by an operating band of the electronic device;
    activating each switch identified by the first control signal by applying a bias voltage to each switch using a biasing module included in the antenna switching module, wherein activation of each switch forms a connection between the two or more antenna elements coupled to the switch;
    passing wireless communication signals having frequencies within the operating band through the two or more antenna elements coupled by the number of the plurality of switches, the two or more antenna elements forming the antenna; and
    blocking the wireless communication signals from entering the biasing module using a plurality of radio frequency chokes respectively coupled to the plurality of switches.

21. The method of claim 20, further comprising:
    receiving a second control signal from the control module identifying at least one of the plurality of switches identified by the first control signal, the second control signal being generated to increase the operating band of the electronic device; and de-activating the at least one of the plurality of switches identified by the second control signal by removing the bias voltage applied to the at least one of the plurality of switches, thereby decreasing the number of coupled antenna elements forming the antenna.

22. The method of claim 20, further comprising:

receiving a third control signal from the control module identifying at least one switch in addition to the plurality of switches identified by the first control signal, the third control signal being generated to decrease the operating band of the electronic device; and activating the at least one switch identified by the third control signal by applying the bias voltage to the at least one switch, thereby increasing the number of coupled antenna elements forming the antenna.

23. The method of claim 20, further comprising:

receiving a signal indicating placement of a hand proximate to one or more of the plurality of discrete antenna elements; and de-activating each switch coupled to the one or more of the plurality of discrete antenna elements.

24. The method of claim 23, further comprising: activating at least one additional switch that is not proximate to the hand.

25. An electronic device, comprising:

a back housing at least partially formed from a plurality of discrete antenna elements; and an antenna switching module for selectively coupling two or more of the plurality of discrete antenna elements to an antenna feed, the coupled antenna elements forming an antenna for transmitting and/or receiving wireless communication signals, wherein the antenna switching module includes:

a first circuit board comprising a plurality of switches and a plurality of radio frequency chokes, each switch being configured to selectively couple two of the plurality of discrete antenna elements;

a plurality of electrical posts, a first end of each electrical post being coupled to the first circuit board; and a second circuit board coupled to an opposing end of each electrical post and comprising a biasing module configured to selectively apply a bias voltage to one or more of the plurality of switches, wherein the plurality of radio frequency chokes are configured to block the wireless communication signals from entering the biasing module.

26. The electronic device of claim 25, wherein the first circuit board is a flexible circuit board.

27. The electronic device of claim 25, wherein the second circuit board is a rigid circuit board.

28. The electronic device of claim 25, wherein the second circuit board further includes a control module configured to provide a control signal indicating the plurality of switches to be connected by the antenna switching module.

29. The electronic device of claim 25, wherein the antenna switching module further includes a capacitive sensing module for sensing placement of a hand proximate to one or more antenna elements.

* * * * *